United States Patent [19]

Björklund et al.

[11] Patent Number: 5,615,776
[45] Date of Patent: Apr. 1, 1997

[54] MOUNTING & TENSIONING ARRANGEMENTS FOR SCREENS

[75] Inventors: Ola Björklund, Älvsjö, Sweden; Alexander Ritchie, Kincardineshire; George Souter, Aberdeen, both of Great Britain

[73] Assignee: Alfa Laval Separation AB, Tumba, Sweden

[21] Appl. No.: 676,436

[22] Filed: Jul. 8, 1996

Related U.S. Application Data

[63] Continuation of Ser. No. 302,742, filed as PCT/SE93/00340 Apr. 19, 1993 published as WO93/20954 Oct. 28, 1993, abandoned.

[30] Foreign Application Priority Data

Apr. 21, 1992 [GB] United Kingdom .................. 9208629

[51] Int. Cl.$^6$ ..................................................... B07B 1/49
[52] U.S. Cl. ........................... 209/403; 209/405; 209/412
[58] Field of Search ..................................... 209/402, 401, 209/403, 404, 405, 412, 413, 274, 281, 268, 314

[56] References Cited

U.S. PATENT DOCUMENTS

| | | |
|---|---|---|
| 1,879,377 | 9/1932 | McNeely . |
| 2,378,463 | 6/1945 | Burls . |
| 3,381,820 | 5/1968 | Cecka . |
| 3,968,033 | 7/1976 | Illemann et al. ...................... 209/403 |
| 4,568,455 | 2/1986 | Huber et al. . |

FOREIGN PATENT DOCUMENTS

| | | |
|---|---|---|
| 1258995 | 1/1972 | United Kingdom . |
| 2161715 | 1/1986 | United Kingdom . |
| 2176424 | 12/1986 | United Kingdom . |

OTHER PUBLICATIONS

Derwent's Abstract No. 85–85898/14 (Abstract of SU A 1114481.

*Primary Examiner*—David H. Bollinger
*Attorney, Agent, or Firm*—Fish & Richardson P.C.

[57] ABSTRACT

In a vibratory screening apparatus, a withdrawable lower fine mesh screen assembly (17) has a screen unit (19) releasably mounted on a grid/frame structure (20). The screen unit (19) has a sheet (21) of mesh material bonded to a grate or lattice (22) of a yieldable material such as a hard rubber, and this lattice (22) and the edges of the mesh (21) are also fixed to relatively rigid side members (23) which are mutually free each from the others. In the structure (20), a rigid grate of support bars (26) supports the lattice (22) with a sliding contact interface, and a frame (28) incorporates pneumatically actuated tensioners (30) and clamps (34A, 34B) respectively for tensioning/locking the screen unit (19) and coupling the screen assembly to the vibratory structure. The tension in the screen unit (19) is adjustable whilst on the structure (20) by virtue of the yieldability of the lattice (22) and its sliding contact interface with the support bars (26). Away from the screen assembly, the screen unit (19) is relaxed and less vulnerable to damage or deterioration of tensioning quality.

18 Claims, 5 Drawing Sheets

MOUNTING & TENSIONING ARRANGEMENTS FOR SCREENS

This is a continuation of Ser. No. 08/302,742, filed as PCT/SE93/00340 Apr. 19, 1993 published as WO93/20954 Oct. 28, 1993, now abandoned.

This invention relates to screens and to screen mounting and tensioning arrangements in screening apparatus for use, for example, in the separation of solids from a slurry.

Hereafter in this specification, including the appended claims, the following expressions have the meanings ascribed, thus "screening apparatus" is a general reference to an entire or complete machine; "screen assembly" refers to a sub-assembly of a screening apparatus and envisages a screen unit together with a supporting and/or carrying structure therefor which may be withdrawable from the screening apparatus; and "screen unit" is a mesh material fixed directly to frame or supporting members.

Vibratory screening apparatus is used in the treatment of oil well drilling muds in order to remove and discharge cuttings and to reclaim the liquid. Presently proposed such apparatus has an upper relatively coarse mesh screen-assembly and a lower relatively fine mesh screen assembly. Both of these screen assemblies are vibrated and both may be mounted in a common carrying structure or "basket" with a common vibrating means. In the context of drilling mud reclamation, the present invention is concerned particularly with a fine mesh screen assembly and a screen unit therefor.

In U.S. Pat. Specification No. 1,879,377 (McNeely), principal considerations for the construction and operation of a fine mesh screen unit are described, and teach that the fine mesh material be sufficiently and evenly tensioned and provided with support or backing which support or backing should be distributed throughout the area of the mesh material and should also be unitary with the mesh material. Thus, McNeely describes a screen unit comprising a pretensioned fine mesh material brought into contact with and fixed to a pretensioned coarse mesh or grid. Similar concepts are taught in UK Patent Specification No. 2161715 (Bailey). In both McNeely and Bailey, the pretension in the fine mesh material is maintained by the backing or support. Disadvantages of this arrangement are that a fine mesh material being somewhat fragile is vulnerable to accidental damage whilst under tension; moreover, the quality of tensioning in respect of degree and/or evenness can deteriorate during storage due to "creep" in the mesh material; and also, once the screen unit has been manufactured, on-site or user-adjustment of the tension in the mesh material is not feasible.

In U.S. Pat. Specification No. 4,457,839 (Bailey) a lower or bottom screen assembly within the main structure of a vibratory screening apparatus has a support frame which is withdrawable in the fore-and-aft direction to receive a screen unit comprising a pretensioned mesh material fixed to a frame. Fitting or changing the screen unit can with Bailey's arrangement be accomplished quickly, and pressure fluid clamps located within the main structure are operable to act on the screen assembly when the support frame and screen unit are pushed in to enable coupling of these parts to the vibrator means. However, this screening apparatus relies upon the pretension in the fine mesh material and therefore offers no solution to the mentioned disadvantages.

In U.S. Pat. Specification No. 4,568,455 (Huber et al) it is proposed to fix a mesh material to an inflatable frame which is secured in a rigid support and locked therein by inflating the frame and simultaneously tensioning the mesh material, however, this tension is not subsequently adjustable; and the proposals provide no distributed support for the mesh material as taught by McNeely. U.S. Pat. Specification No. 3,176,843 (Hoskins et al) also proposes an inflatable frame with a mesh material having edge portions thereof wrapped around the frame members so that the mesh material is tensioned to a desired tension value upon inflation of the frame. Thus, Hoskins et al envisages in-situ adjustment of tension, but provides no distributed support for the mesh material. The Hoskins et al proposals prima facie present difficulty in arranging the mesh material to ensure even tensioning thereof.

An object of the present invention is to provide in or for screening apparatus, screen mounting and tensioning arrangements whereby the mentioned disadvantages are obviated or mitigated.

According to the present invention, there is provided a screen assembly comprising a mesh material under tension and in contact with a generally horizontally-disposed grid-like support means for distributed support of the mesh material, the latter being fixed to the said support means at substantially all points or areas of contact; characterized in that the grid like support means comprises a first grid means or grate of relatively rigid construction and a second grid means or grate of a material which is relatively yieldable at least in the generally horizontal direction, that the mesh material is fixed to the second grid means, and that these two grid means or grates are arranged one in contact with the other.

In the screen assembly according to the present invention, the first grid means provides substantially rigid support for the second grid means which distributes such support over the area of the mesh material; and at the same time the tension in the mesh material can be applied or adjusted taking advantage of the relative yieldability of the second grid means which can follow the mesh material by virtue of a sliding contact with the first grid means or whilst one grid means is temporarily lifted out of contact with the other.

Further, according to the present invention, there is provided a screen unit for a screening assembly as aforesaid; characterized in that the screen unit comprises a mesh material in contact with a grid means or grate of a material which is yieldable at least in said generally horizontal direction for example a hard rubber, and that the mesh material is fixed to the grid means or grate at substantially all points or areas of contact.

In accordance with the present invention, the choice of a yieldable material in this context means that when the mesh material has been fixed to the grid means and released from a tensioning means, the yieldable characteristic of the grid means allows the mesh material to relax. Thus, the inventive screen unit is less vulnerable to damage and/or less liable to deterioration of tensioning quality whilst the screen unit is in storage or in transit. Moreover, because the inventive screen unit is tension-adjustable, the mesh material need not during manufacture of the screen unit be fully tensioned but need only be evenly taut when fixed to the grid means. It is preferable that the said yieldable material should also have a resilient or elastic property so that the grid means made of this material can yield without substantial buckling or distortion to both increasing and decreasing tension of the mesh material.

Preferably, the screen unit includes substantially rigid side members defining a frame, and the grid means engages these side members which are mutually relatively shiftable in said generally horizontal direction.

The rigid side members, by virtue of being mutually relatively shiftable, do not prevent relaxation of the mesh material and the grid means, but provide a means of transmitting, evenly, tension back into the mesh material.

An embodiment of the present invention will now be described, by way of example, with reference to the accompanying drawings, in which.

Figure 1:
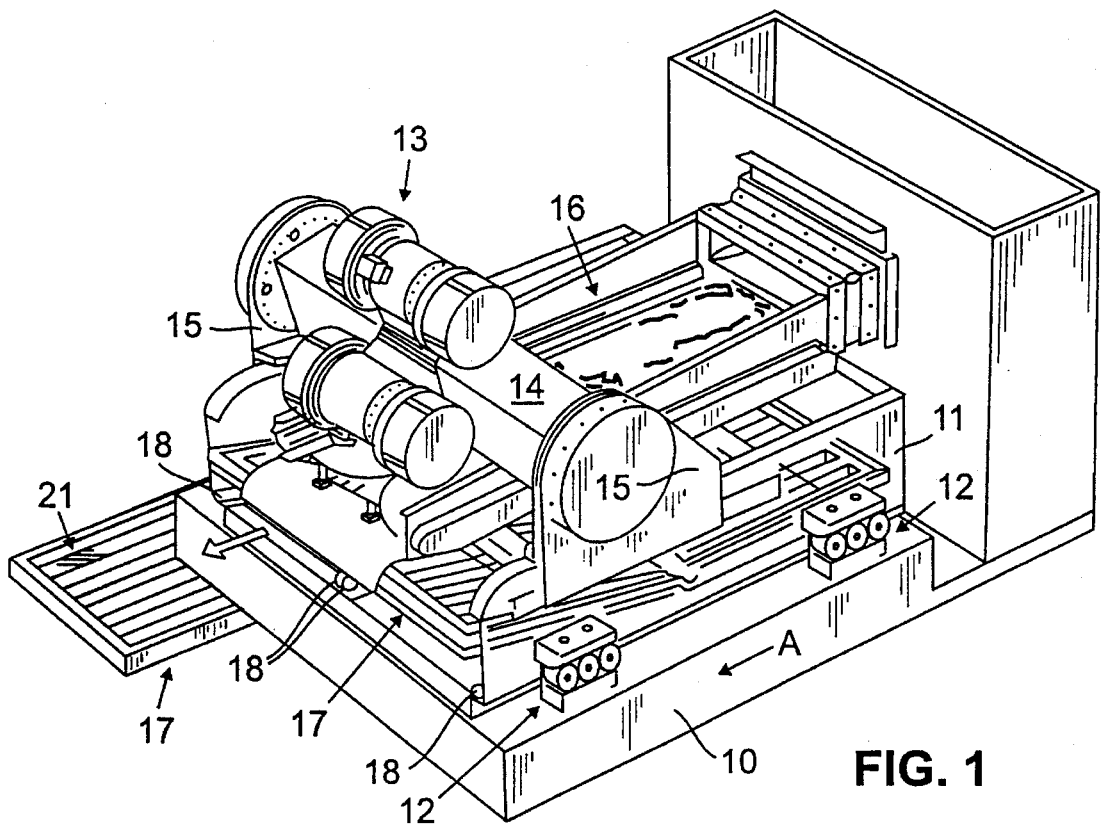
FIG. 1 is a perspective view of vibratory screening apparatus showing part of a lower fine mesh screen assembly partially withdrawn.

In FIG. 1 of the drawings, vibratory screening apparatus consists of a base structure 10 on which is mounted a carrier structure or "basket" 11 using mountings 12 adapted to permit the basket 11 to be vibrated relative to the base structure 10. The vibratory action of the basket 11 is by means of vibrator motors 13 mounted on a cross beam 14 secured to the basket 11 by means of side plate structures 15.

Figure 2:
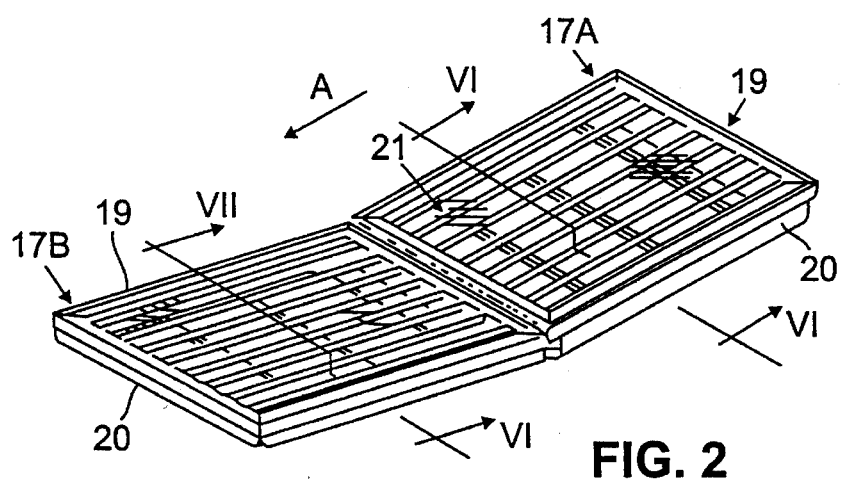
FIG. 2 is a perspective view of part of a fine mesh screen assembly from FIG. 1.

The basket 11 carries a generally horizontal upper screen assembly 16 featuring a relatively coarse mesh material; and two generally horizontal lower screen assemblies 17 arranged side-by-side and featuring relatively fine mesh material. In fact, the screen assemblies 17 each comprise two screen assemblies 17A and 17B which are mutually hinged end-to-end as shown in FIG. 2. The fore-and-aft or feed direction for the vibratory screening apparatus is represented by arrow A in FIGS. 1 and 2. The screen assemblies 17 are withdrawable from the screening apparatus by sliding on ledges 18 defined by the structure of the basket 11. When the screen assemblies 17 are pushed into the basket 11, each rear screen assembly 17A is clamp-engaged with the associated ledges 18; and each front screen assembly 17B can be shifted up and down about the hinge connection with its rear screen assembly for the purpose of altering the slope or operating angle of the front screen assembly. At any chosen slope configuration, each front screen assembly 17B may be clamp-engaged with the vertical or upright side member of the basket 11 as is described in further detail later herein. The angle of a front screen assembly determines the depth of the pool of material on the rear screen assembly which influences the screening action in known manner.

Each screen assembly 17A, 17B consists of a removable screen unit 19 and a grid/frame construction 20. These parts 19, 20 and their manner of operation will now be described more fully with reference to FIGS. 3 to 7.

Figure 3:
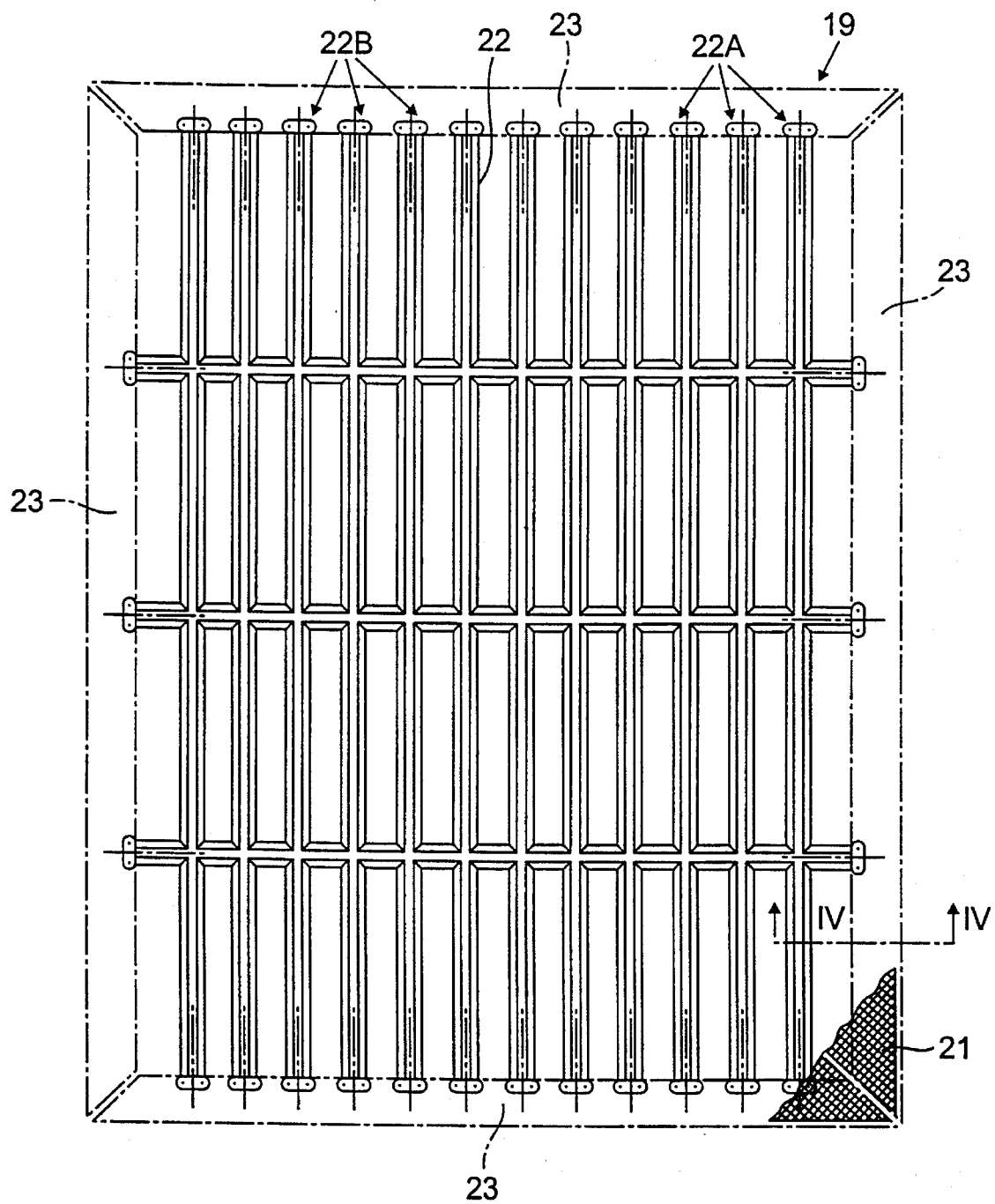
FIG. 3 is a plan view of a screen unit in accordance with the present invention.
Figure 4:
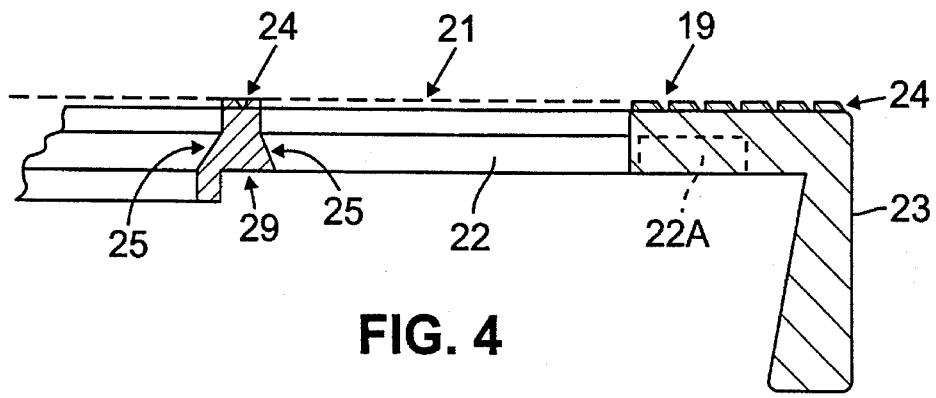
FIG. 4 is a cross-sectional view on the line IV—IV in FIG. 3 and to a larger scale than FIG. 3.

In FIGS. 3 and 4, the screen unit 19 consists of a rectangular sheet 21 of mesh material fixed to a (second) grid means or grate 22 in the form of a lattice moulded from a yieldable and resilient or elastic material for example a hard rubber compound. The lattice or grate 22 is moulded without any peripheral frame, and the free ends of the lattice members define lug elements 22A which are received in appropriately shaped recesses in relatively rigid side members 23 which form a (first) frame of the screen unit 19. The lug elements 22A are engaged with anchor pins 22B which are set into the side members 23 and extend through holes in the lug elements 22A, and a cement is used to keep the lug elements in their recesses. As can be seen in FIG. 3, each of the side members 23 has a mitred end-configuration; and it is essential that the side members 23 are mutually free each from the others at least to allow these side members to be mutually relatively shiftable in the generally horizontal direction. In a modification within the scope of the appended claims, for example, these side members are mutually interengaged by tongue-and-slot means, instead of being simply mitred, to restrain undesirable mis-alignment in the general plane of the screen unit.

In the manufacture of the screen unit 19, the sheet 21 of mesh material is first made evenly taut in a framing jig (not shown) in known manner. The lattice or grate 22 together with the attached side members 23 are arranged on a second jig so that the lattice and the side members are respectively flat and in rectangular configuration. A bonding compound or adhesive 24 (see FIG. 4) is then applied to the top surfaces of the lattice 22 and of the side members 23 and then the taut mesh material 21 is brought into contact with the lattice and the side members and held until the bonding compound or adhesive 24 has set. Thereafter, the mesh material 21 is released whereupon the mutual independence of the side members 23 and the yieldability of the lattice 22 permits the mesh material 21 to relax.

It will be noted that the rectangular windows or panels defined by the lattice or grate 22 feature chamfered surfaces 25 which provide seating for repair insert panels (not shown) which may be inserted and bonded in place after cutting away a damaged window panel of the mesh material 21. Each of the side members 23 is made of a metal such as an aluminium alloy, or from a plastics material suitably reinforced to obtain the requisite rigidity. It will be noted that the upright leg of each side member 23 defines a tapered configuration the purpose of which becomes apparent later herein.

Figure 5:
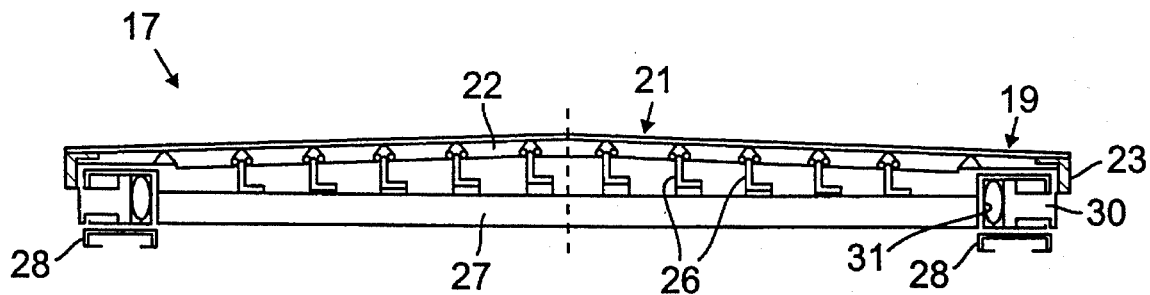
FIG. 5 is a cross-sectional elevation of part of a fine mesh screen assembly in accordance with the present invention.
Figure 6:
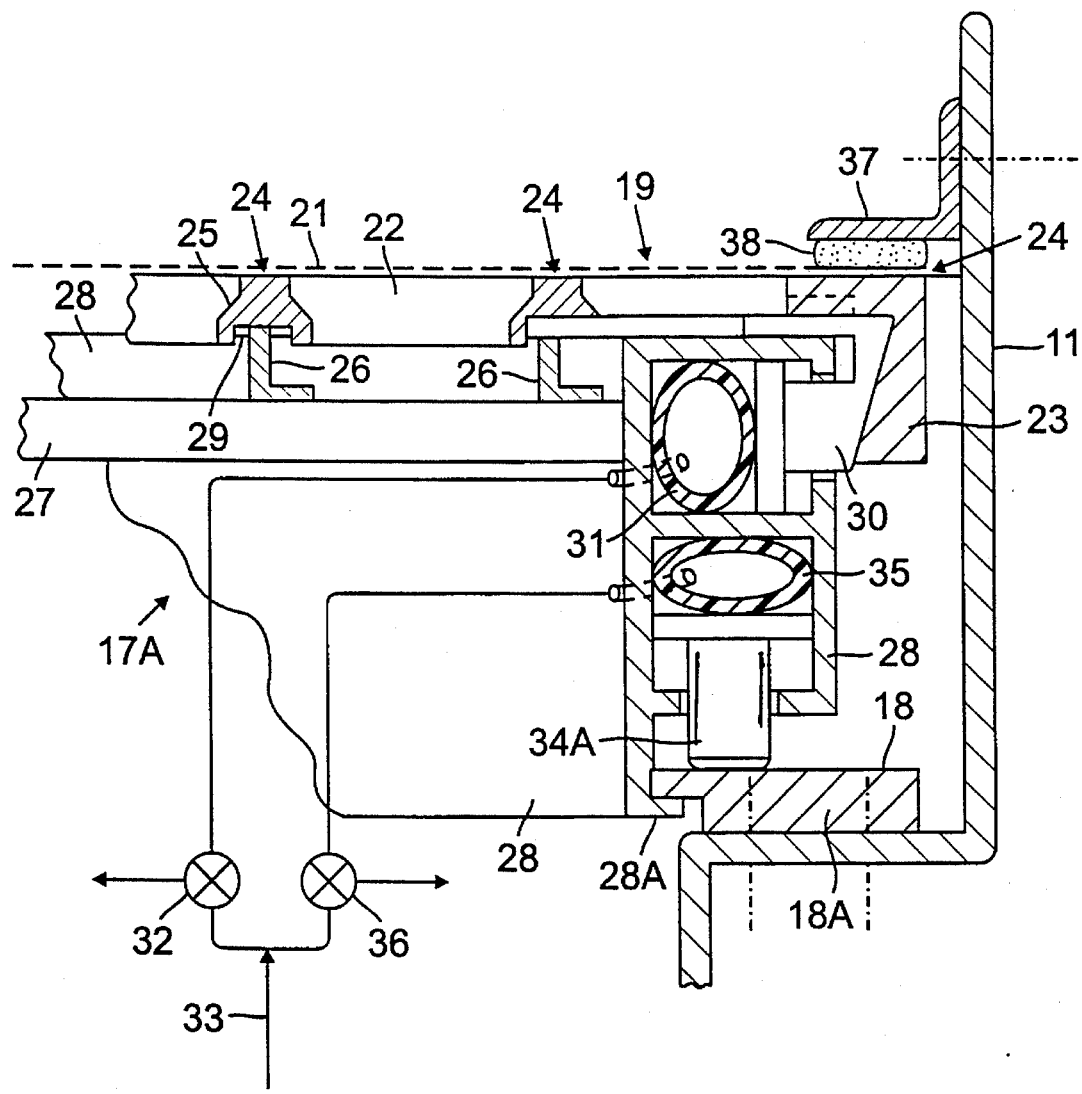
FIG. 6 is a partly diagrammatic sectional view of part of the screen assembly of FIG. 2 on the line VI—VI in FIG. 2.

In FIG. 5, the screen unit 19 is shown mounted on a (first) grid means or grate and (second) frame. This grid means or grate is of relatively rigid construction and consists of a set of mutually parallel support bars 26 which extend in the fore-and-aft direction and are mounted on cross members 27 secured to a rectangular (second) frame 28. The fore-and-aft members of the lattice or grate 22 define channels 29, and the lateral spacing of these lattice members corresponds with the lateral spacing of the support bars 26 so that the top edges of these support bars are embraced by the channels 29 thus providing a sliding contact interface between the yieldable grid means of the screen unit 19 and the rigid grid means of the screen assembly. As can be seen in FIG. 5, the support bars 26 vary slightly in height to a maximum near the centre of the screen unit 19 so that the rigid grid means defines a configuration which is convex towards the screen unit 19. The convex configuration assists in maintaining contact between the middle portion of the screen unit 19 and the respective support bars 26 during vibratory action.

The frame 28 incorporates shiftable tensioning elements 30 which engage the insides of the side members 23. Several such tensioning elements 30 are provided along each side of the frame 28 and are associated with first actuating means in the form of elongate pneumatic bladders 31 provided one for each side of the frame 28 and all connected by way of an operating valve 32 to a common source of pneumatic pressure 33. Thus, inflation of the bladders 31 causes extension of the tensioners 30 which simultaneously effects tensioning of the mesh material 21 and locks the screen unit 19 in position by means of the tapered configuration of the side members 23. It will be understood that the bladders 31 are inflated once the screen assemblies 17 have been pushed into the basket 11. Also, it will be understood that the lattice 22 yields to the movement of the relatively rigid side members 23 allowing the mesh material 21 to resume the evenly taut condition pertaining at the time of manufacture of the screen unit 19. Moreover, the evenness or quality of=tensioning is maintained for increased tension values obtained by increasing pressure in the bladders 31.

Figure 7:
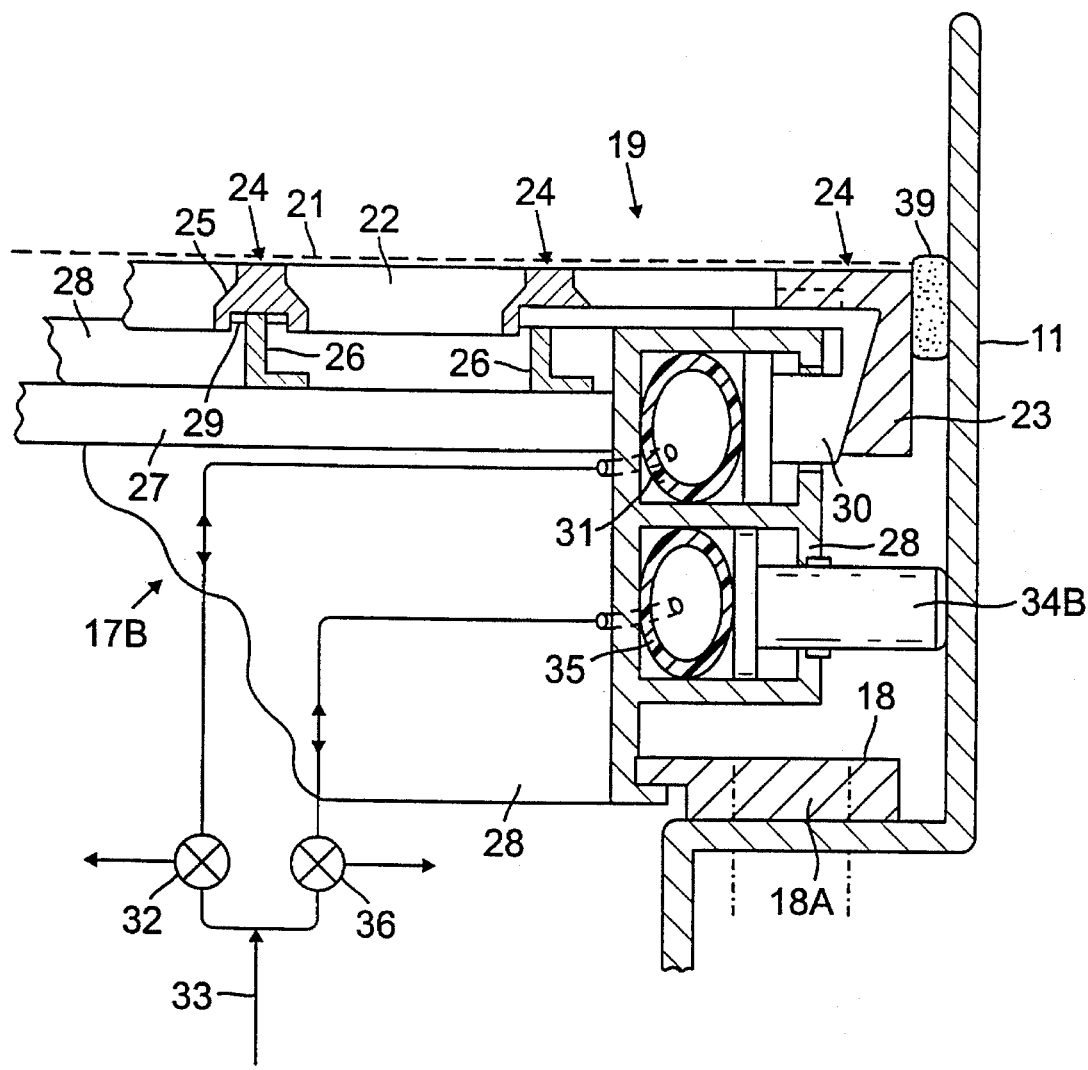
FIG. 7 is a partly diagrammatic sectional view of part of the screen assembly of FIG. 2 on the line VII—VII in FIG. 2.

In order to provide coupling of the screen assemblies 17 to the basket 11 so that vibratory action is transmitted to the screen assemblies, the frame 28 further incorporates shiftable clamp elements 34A (FIG. 6) and 34B (FIG. 7). As mentioned in the foregoing description, the rear screen assemblies 17A are clamped to the ledges 18 of the basket 11; and the forward screen assemblies 17B are clamped to the upright side portions of the basket 11. Thus, in FIG. 6 the frame 28 is provided with a lip 28A for engagement with an edge portion of a slide rail 18A which is secured in the basket 11 and defines the ledge 18. Several of the clamp elements 34A are provided in each lateral member of the frame 28 and project downwards therefrom for engagement with the ledge surface 18 to provide a clamp action in conjunction with the lip 28A. The clamp elements 34A are operated, in each lateral side member of the frame 28, by a common second actuator means in the form of a pneumatic bladder 35 connected to the pressure source 33 by way of a control valve 36. The control valves 32, 36 are operable to feed and exhaust the respective bladders 31 and 35. In FIG. 7, the clamp elements 34B are operated similarly to the clamp elements 34A in FIG. 6 except that the clamp elements 34B project laterally for engagement with the side wall of the basket 11 at any position thereon when the angle of the front or forward screen assembly has been set as desired.

During vibratory screening action, it is desirable to impede flow of materials around the sides of the screen units 19. To this end, for the rear screen assemblies 17A, the basket 11 is provided with inwardly extending abutment rails 37 and resilient sealing strips 38 respectively positioned and dimensioned so that when the clamp elements 34A are operative, the edge portions of the screen unit 19 compress the sealing strips 38. For the forward screen assemblies 17B, resilient sealing strips 39 are provided to close the gaps between the side walls of the basket 11 and the adjacent sides of the screen unit 19.

We claim:

1. A screen assembly comprising a mesh material (21) under tension, a generally horizontally disposed apertured support means (22, 26) for distributed support of said mesh material (21), said mesh material (21) being superimposed on and in contact with said support means (22) and fixed to said support means at substantially all points of contact, said support means comprising a first grate (26) of relatively rigid construction and a superimposed second grate (22) of a material which is relatively yieldable at least in the generally horizontal direction, said mesh material (21) being fixed to said second grate (22) and the two grates (22, 26) being arranged in contact with one another.

2. A screen assembly according to claim 1, characterized in that the contact between the said two grates (22, 26) is a sliding contact.

3. A screen assembly according to claim 1, characterized in that the second grate is made of a material having a resilient or elastic property.

4. A screen assembly according to claim 1, characterized in that the second grid means (22) is made of a hard rubber.

5. A screen assembly according to claim 1, characterized in that the second grate (22) and the mesh material (21) together define a screen unit (19) of rectangular configuration in plan view, that along the sides of said configuration the second grate (22) engages substantially rigid side members (23) defining a first frame, and that these side members (23) are mutually relatively shiftable in said generally horizontal direction.

6. A screen assembly according to claim 5; characterized in that the mesh material (21) is fixed to each of the said side members (23).

7. A screen assembly according to claim 5; characterized in that the first grate (26) is supported in a second frame (28) of rectangular configuration similar to that of the said first frame, that said side members (23) are arranged around said second frame (28), that the second frame (28) incorporates shiftable tensioning elements (30) engaging said side members (23), and that these tensioning elements (30) are associated with first actuating means (31) operable to shift these tensioning elements (30) to vary tension in the screen unit.

8. A screen assembly according to claim 7; characterized in that the said second frame (28) incorporates shiftable clamp elements (34A, 34B) associated with second actuating means (35) operable to shift the clamp elements (34A, 34B) for engaging and disengaging a carrying structure (11) of a screening apparatus.

9. A screen assembly according to claim 8; characterized in that the first (31) and second (35) actuating means are mutually independently operable pneumatic actuating means.

10. A screen assembly according to claim 7; characterized in that the said screen unit (19) is releasably mounted on the first grate (26) and the second frame (28).

11. Vibratory screening apparatus characterized by incorporating a screening assembly (17) according to claim 1.

12. Vibratory screening apparatus characterized by incorporating two screening assemblies (17A, 17B) each according to claim 1, and in that these assemblies are mutually hinged end-to-end with respect to the fore-and-aft direction (A) of the apparatus.

13. A screen assembly according to claim 1 wherein the first and second grates (26, 22) contact one another at a series of points which define a theoretical surface which is convex toward the second grate.

14. A screen unit comprising a grate (22) and a mesh material (21) superimposed on and in contact with said grate (22), said grate (22) being adapted to be disposed in a generally horizontal plane for distributed support of said mesh material (21), said grate being made of a material which is yieldable at least in directions parallel to said plane, said mesh material being fixed to said grate at substantially all points of contact.

15. A screen unit according to claim 14; characterized by including substantially rigid side members (23) defining a frame, and wherein the grate (22) engages these side members (23) which side members are mutually relatively shiftable in said generally horizontal direction.

16. A screen unit according to claim 15; characterized in that the mesh material (21) is fixed to each of said side members (23).

17. The screen unit claimed in claim 14 wherein the grate is hard rubber.

18. A screen unit according to claim 14 wherein said mesh material is in a relaxed condition.

* * * * *